(12) United States Patent
Hazzard

(10) Patent No.: US 8,464,408 B2
(45) Date of Patent: Jun. 18, 2013

(54) HARDWARE FOR FURNITURE ASSEMBLY

(76) Inventor: Tracy Leigh Hazzard, Ladera Ranch, CA (US)

( * ) Notice: Subject to any disclaimer, the term of this patent is extended or adjusted under 35 U.S.C. 154(b) by 208 days.

(21) Appl. No.: 12/793,142

(22) Filed: Jun. 3, 2010

(65) Prior Publication Data

US 2010/0310310 A1  Dec. 9, 2010

Related U.S. Application Data

(60) Provisional application No. 61/183,687, filed on Jun. 3, 2009.

(51) Int. Cl.
*F16B 7/02* (2006.01)
*F16B 12/24* (2006.01)

(52) U.S. Cl.
USPC ........ 24/706.8; 24/706.6; 24/706.5; 312/111; 312/140

(58) Field of Classification Search
USPC ................. 24/115 L, 705, 706, 706.2, 706.3, 24/706.5, 706.6, 706.8; 312/111, 140
See application file for complete search history.

(56) References Cited

U.S. PATENT DOCUMENTS

| | | | |
|---|---|---|---|
| 581,136 A * | 4/1897 | Preece | 74/162 |
| 700,412 A * | 5/1902 | Fischer | 279/75 |
| 778,413 A * | 12/1904 | Kilmon | 384/126 |
| 1,053,883 A * | 2/1913 | Shepphard | 24/706.8 |
| 3,421,404 A * | 1/1969 | Jacobs | 411/55 |
| 3,527,486 A * | 9/1970 | Gamp | 403/11 |
| 3,551,963 A * | 1/1971 | Mosher | 24/618 |
| 3,858,280 A * | 1/1975 | Martens | 70/57.1 |
| 4,280,256 A * | 7/1981 | de Jong | 24/706.8 |
| 4,353,663 A * | 10/1982 | Glickman | 403/230 |
| 4,523,356 A * | 6/1985 | Charlot, Jr. | 24/706.8 |
| 4,644,617 A * | 2/1987 | Tupper et al. | 24/611 |
| 4,726,705 A * | 2/1988 | Gomes | 403/292 |
| 5,246,322 A * | 9/1993 | Salice | 411/15 |
| 5,337,459 A * | 8/1994 | Hogan | 24/136 A |
| 5,779,410 A * | 7/1998 | Lautenschlager et al. | 411/33 |
| 6,004,065 A * | 12/1999 | Higdon et al. | 403/384 |
| 6,302,627 B1 * | 10/2001 | Reichelt | 411/33 |

* cited by examiner

*Primary Examiner* — Robert J Sandy
*Assistant Examiner* — David Upchurch
(74) *Attorney, Agent, or Firm* — Barlow, Josephs & Holmes, Ltd.

(57) ABSTRACT

A hardware system is provided for use in ready-to-assembly (RTA) furniture that allows assembly thereof without the need for tools. The system includes a pin fastener and a pin receiver assembly. The pin receiver assembly is installed into one panel of the RTA furniture while the pin fastener is installed into another panel or component that is to be fastened to the first panel. The pin receiver includes a retaining means therein that serves to releasably engage the pin fastener when it is inserted therein. The pin receiver includes a body having engaging members therein that engage the pin shaft when the pin shaft is inserted into the pin receiver. In a preferred embodiment the pin receiver can be disengaged from the pin fastener using a magnet.

7 Claims, 16 Drawing Sheets

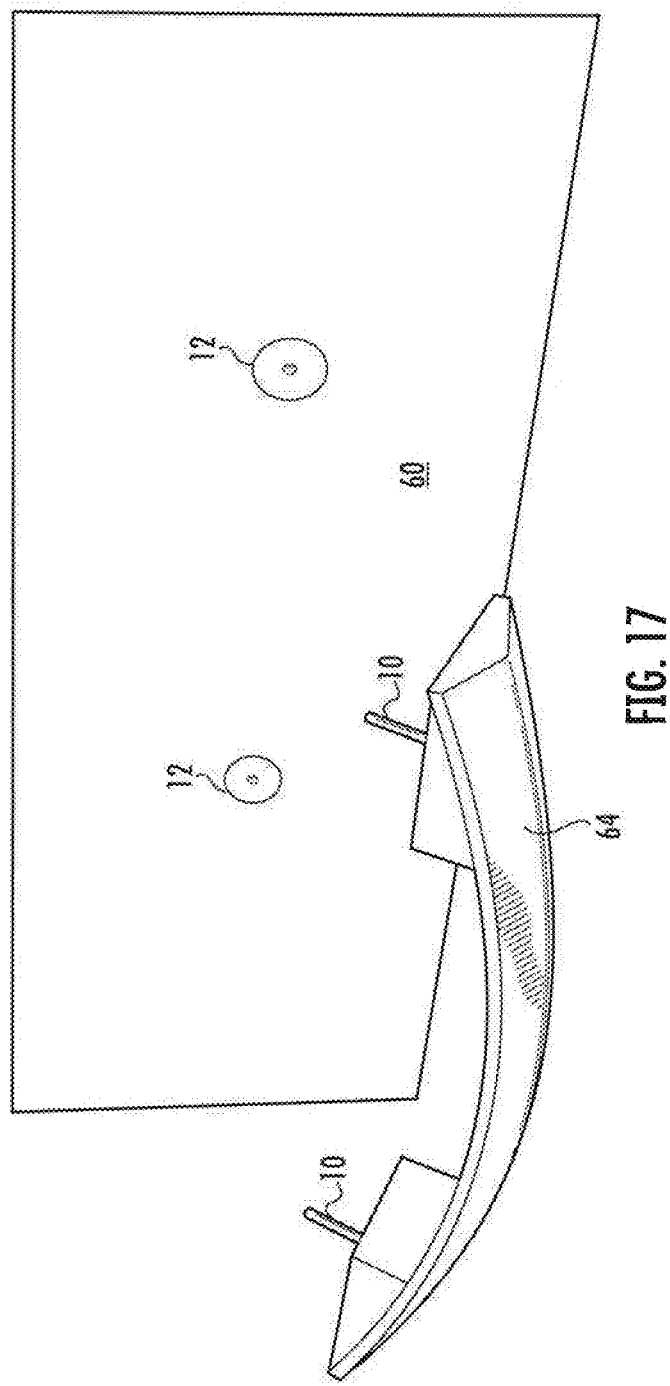

HARDWARE FOR FURNITURE ASSEMBLY

CROSS-REFERENCE TO RELATED APPLICATIONS

This application is related to and claims priority from earlier filed U.S. Provisional Patent Application No. 61/183,687, filed Jun. 3, 2009.

BACKGROUND OF THE INVENTION

The present invention relates generally to a hardware system for ready-to-assembly (RTA) furniture that allows assembly thereof without the need for tools. More specifically, the present invention relates to a modular hardware system for use in RTA furniture that can be employed universally throughout the furniture piece without the need for the use of tools during assembly.

In the furniture market today there is a growing demand for knockdown, RTA furniture that can be easily assembled once it has been transported or shipped from a store or other location to an area in which the furniture is to be used and that can also be easily disassembled for further transportation or storage. The demand for such furniture is great because, ideally, such furniture can be packaged in containers of sufficiently small size to permit cost effective shipping of large furniture pieces in a compact form thereby saving cost for the manufacturer and retailer. Further, RTA furniture in the knockdown state allows transportation of such furniture in conventional automobiles. However, while a compact package is desirable for the shipment and storage of the furniture, the issue of compactness must be balanced against the need for such furniture to be assembled and disassembled by a customer that likely has no particular mechanical skills or experience with the construction of furniture.

As one skilled in the art would appreciate, RTA furniture of the cabinet or desk type will normally include a number of vertical and horizontal panels designed to be joined together. The vertical, or upright, panels define spaces that may receive, for example, fixed or movable drawers, doors or shelves. In the past, attempts to manufacture easily assembled and disassembled furniture, have unfortunately had the disadvantages of requiring the manipulation of specially designed connectors, necessitating the use of both conventional tools such as screwdrivers and wrenches and, many times, specially designed tools. Often, as a result, the assembly process sometimes requires more than minimal mechanical skills. A special problem exists with the construction of furniture having drawers and doors, in that movable drawers and shelves are provided with drawer slides, which typically comprise two interlocking, complementary members that must be affixed to the bottom edge of a drawer, shelf or to an upright panel of the furniture requiring yet a different set of hardware for attachment. Similarly, doors require hinges and still further sets of different hardware.

The use of different sets of hardware then raises another issue in that, with conventional RTA furniture hardware, good quality control is required to ensure that each piece of additional hardware is packaged with the furniture and that the packaging is adequate for the hardware. Furthermore, there exists the potential that a consumer will not assemble a piece of hardware with the same degree of skill and care, as would the manufacturer. For example, screws may be put in crooked or not sufficiently tightened, or tightened too much resulting in stripped threads either in the screw or panel material, which may be wood or particleboard. Even if the assembly process is completed with care, many systems utilize an insert that needs to be indexed when it is assembled into the face of a panel, which adds a complication to the manufacturing process. Other no tools systems, as well as ones that do require tools, tend to loosen with time and vibration. If a piece of furniture is heavily used or moved when fully assembled, the joints between boards tend to open up and contribute to loss of stability. Further, if glue is required, a consumer may use incorrect quantities, or not allow the correct amount of dry time. These and other drawbacks can result in a piece of furniture that is not only not as strong or as durable as it could be, but also one that is less aesthetically appealing.

In addition to all of the above, some mass-market retailers require that all of the furniture they sell have assembly times of less than 30 minutes. Other mass-market retailers are expected to follow this trend in the next few years. This time limit will be a very difficult restriction to meet using traditional hardware to create complex RTA furniture pieces.

There is therefore a need for a hardware system for ready-to-assembly (RTA) furniture that allows assembly thereof without the need for tools. There is a further need for a modular hardware system for use in RTA furniture that can be employed universally throughout the furniture piece without the need for the use of tools during assembly. There is still a further need for a modular hardware system that operates to reliably affix complex RTA furniture components together that can be employed by people having little to no mechanical inclination in a minimum amount of time.

BRIEF SUMMARY OF THE INVENTION

In this regard, the present invention provides for a hardware system that is used in ready-to-assembly (RTA) furniture that allows assembly thereof without the need for tools. The system includes two basic components in the form of a pin fastener and a pin receiver assembly. In general the pin receiver assembly is installed into one panel of the RTA furniture while the pin fastener is installed into another panel or component that is to be fastened to the first panel. The pin receiver includes a retaining means therein that serves to releasably engage the pin fastener when it is inserted therein.

Generally the pin fastener may be simply a pin or shaft with a head at one thereof. In other embodiments the pin may be slidably received within a pin fastener body for further installation into a bore in one of the furniture panels. When the panels to be attached are placed adjacent to one another the pin is slidably displaced into the pin receiver in a manner that fastens the furniture panels/components to one another. The pin fastener may further include a spring therein that biases the pin to a retracted position for future disassembly of the RTA furniture as will be discussed in detail below. Still further, the pin fastener may include a lever or camming device therein that can be displaced in a manner that displaces the pin between an engaged and disengaged position.

The pin receiver includes a body having engaging members therein that engage the pin shaft when the pin shaft is inserted into the pin receiver. Such engaging members are preferably an array of spheres or balls that are spring biased towards the narrow end of a frustoconical outer shell. As the spring urges the engaging members into the shell, the frustoconical shape of the shell urges the engaging members into contact with one another. When the shaft of the engaging pin is inserted therebetween the engaging members are slightly displaced allowing insertion of the engaging pin, but the spring force then urges the engaging members into contact with the pin in a manner that frictionally retains the engaging pin within the pin receiver.

In a preferred embodiment, a ferromagnetic cap is placed between the spring and the engaging members such that a magnet applied to a rear side of the pin receiver will compress the spring allowing the engaging members to disengage from the pin shaft thereby allowing the pin shaft to be withdrawn from the pin receiver. Should a spring be included in the pin fastener body, the spring would automatically displace the pin to a disengaged position when a magnetic force is applied to the pin receiver.

It can be appreciated that the hardware assembly can be employed equally in furniture that requires the fastening of furniture panels, doors, drawers and the like.

It is therefore an object of the present invention to provide a hardware system for RTA furniture that allows assembly thereof without the need for tools. It is a further object of the present invention to provide a modular hardware system for use in RTA furniture that can be employed universally throughout the furniture piece without the need for the use of tools during assembly. It is still a further object of the present invention to provide a modular hardware system that operates to reliably affix complex RTA furniture components together that can be employed by people having little to no mechanical inclination in a minimum amount of time.

These together with other objects of the invention, along with various features of novelty, which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIGS. 16 and 17 are perspective views of the hardware system in the context of drawer/door handles/pulls.

DETAILED DESCRIPTION OF THE INVENTION

Figure 1:
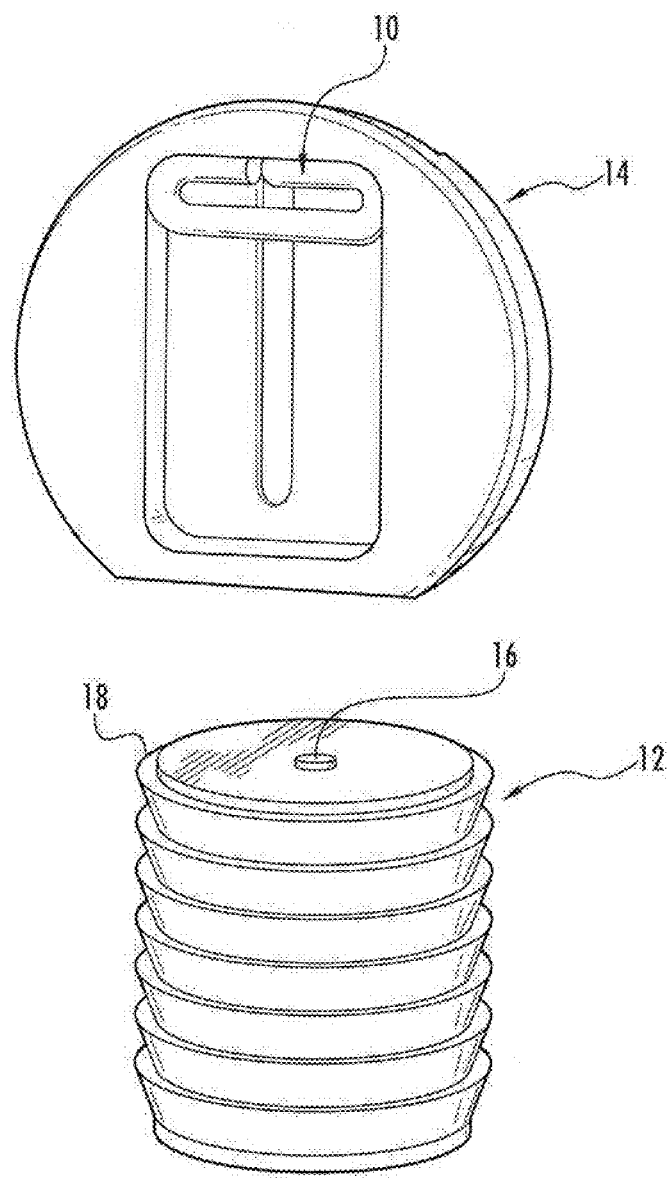
FIG. 1 is a front perspective view of the hardware system of the present invention.

Now referring to the drawings, the hardware system for use in ready-to-assembly (RTA) furniture that allows assembly thereof without the need for tools is generally shown and illustrated. The hardware system of the present invention is a two-component system for the attachment of furniture parts and includes most generally a pin fastener and a pin receiver assembly. In general the pin receiver assembly is installed into one panel of the RTA furniture while the pin fastener is installed into another panel or component that is to be fastened to the first panel. The pin receiver includes a retaining means therein that serves to releasably engage the pin fastener when it is inserted therein.

It should be appreciated that in the context of the present invention the hardware is described as a connection system for attaching furniture parts in RTA furniture assemblies. While the term furniture is employed herein, it should be appreciated by one skilled in the art that furniture is intended in its broadest sense to include any assembly traditionally known as furniture as well as any shelving unit or cabinet. Further, while furniture parts are described, the term furniture parts is intended to include furniture panels, drawer panels, doors, shelves, valences, shelf supports, drawer glides, hinges, door knobs, door handles, drawer knobs and drawer pulls.

Turning now to FIG. 1, the connecting hardware for furniture parts can be seen generally including a pin fastener 10 and a pin receiver 12. Further, it can be seen that the pin fastener 10 is slidably received within a fastener body 14 to allow it to operate as will be described in more detail below. Additionally, the pin receiver 12 can be seen to include an aperture 16 in a first end 18 thereof to slidably receive the shaft portion of the pin fastener 10.

Figure 2:
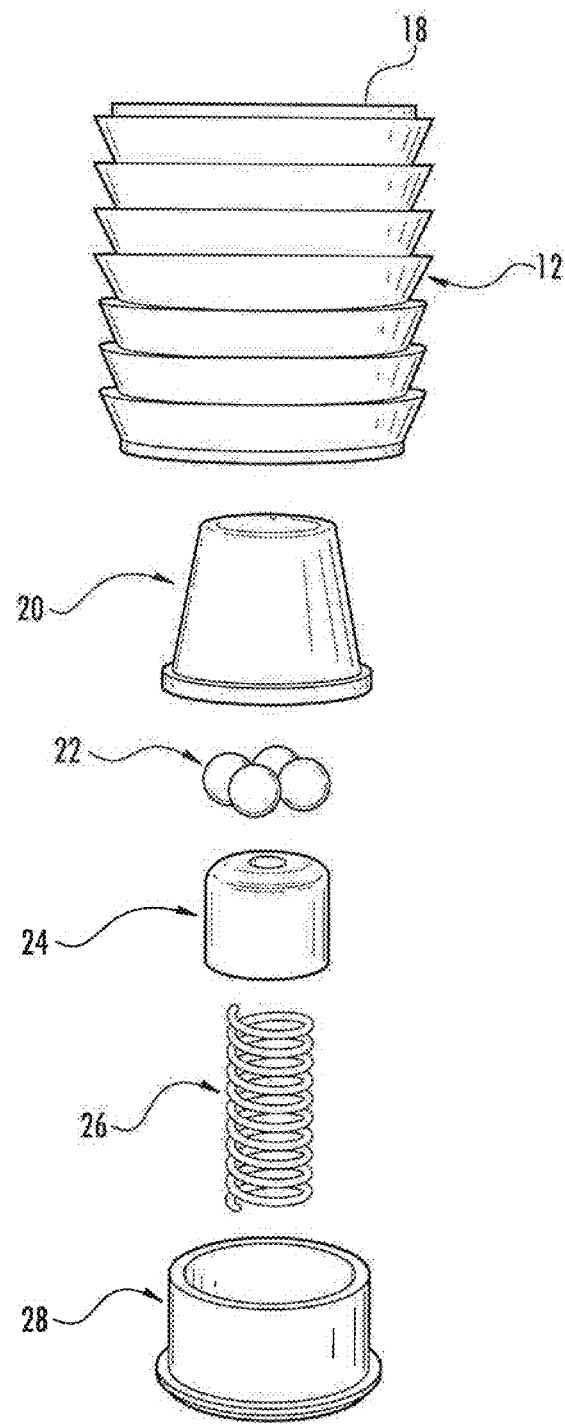
FIG. 2 is a front, exploded perspective view of the pin receiver.

As can be seen best at FIG. 2 the pin receiver 12 is shown in an exploded fashion to illustrate its components more clearly. The components shown within the figure illustrate one preferred embodiment of a means for releasably engaging the shaft of the pin fastener 10 in said received position when it is extended through the aperture 16 in the pin receiver 12. The components of the pin receiver 12 can be seen to include a shell 20, a circular array of spherical retention members 22, a ferromagnetic cap 24, a spring 26 and an end cap 28. While a number of components are disclosed for use in the pin receiver 12, in the most basic form, the pin receiver 12 may include only the spheres 22 and the spring 26 as will be described in an operational context below.

Figure 3:
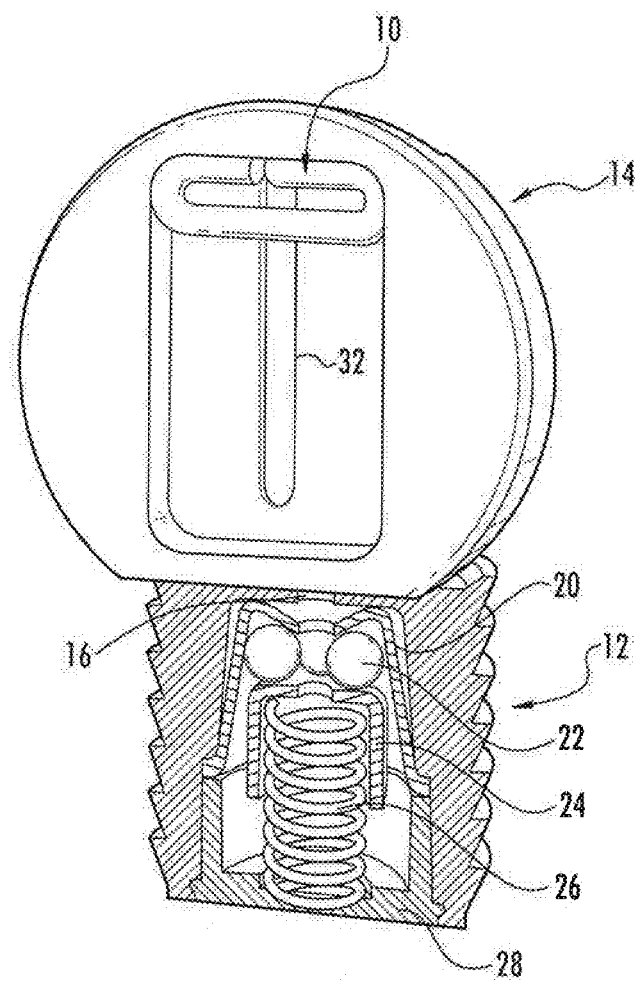
FIG. 3 is a front perspective view of the hardware system of the present invention with the pin in a disengaged position, the pin receiver shown in cross section and the means for engaging in an engaged position.
Figure 4:
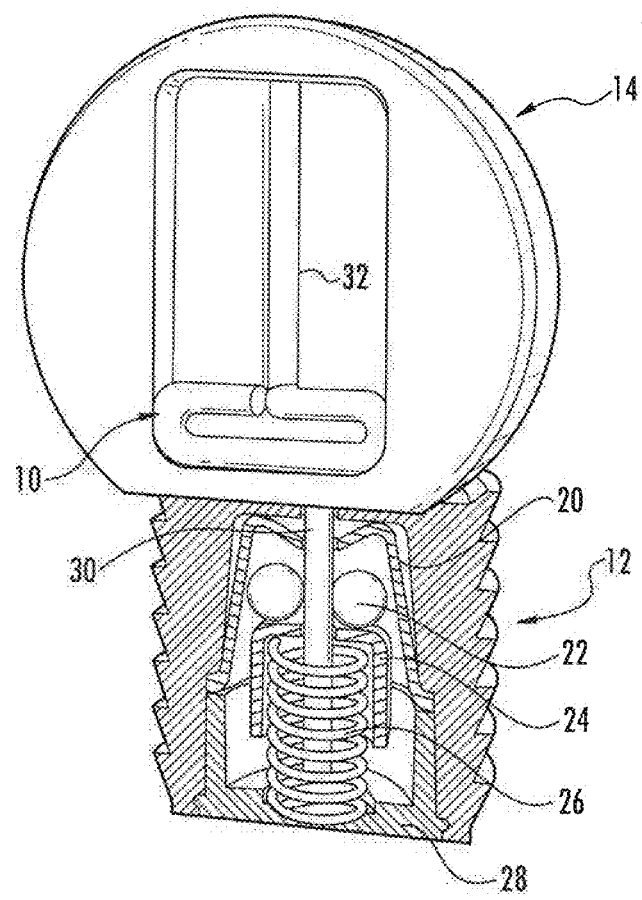
FIG. 4 is a front perspective view of the hardware system of the present invention with the pin in an engaged position, the pin receiver shown in cross section and the means for engaging in an engaged position.

Turning now to FIGS. 3-6 in combination, operation of the hardware connector system is illustrated. In FIG. 3, the pin receiver 12 is shown with the means for engaging in the engaged position. In this position the spheres 22 can be seen as being urged towards the narrow end of the frustoconical shell 20 by the spring 26 bias against the bottom thereof. The pin fastener 10 is in the disengaged position where it is slid upwardly such that the shaft 30 of the pin fastener 10 is within the channel 32 in the fastener body. In FIG. 3, the pin fastener 10 can be seen as being displaced downwardly such that the pin fastener shaft 30 extends through the aperture 16 in the pin receiver 12. While the shaft 30 displaces the spheres 22 downwardly and outwardly as it is inserted, when the shaft 30 is fully inserted, the spring 26 bias urges the spheres 22 upwardly such that they bind against the frustoconical walls 20 of the shell and the outer surface of the shaft 30, engaging the shaft 30 and preventing it from being withdrawn from the pin receiver 12.

It should be appreciated, as was stated above, in the most basic form, the pin receiver 12 may eliminate the shell 20 and the ferromagnetic cap 24. In this arrangement the walls of the cavity within the pin receiver 12 would instead have a frustoconical shape that mirrors that of the shell 20 and serves the same operational function of the shell 20. In this manner such a pin receiver 12 would function equally as well and fall within the scope of the present invention.

Figure 5:
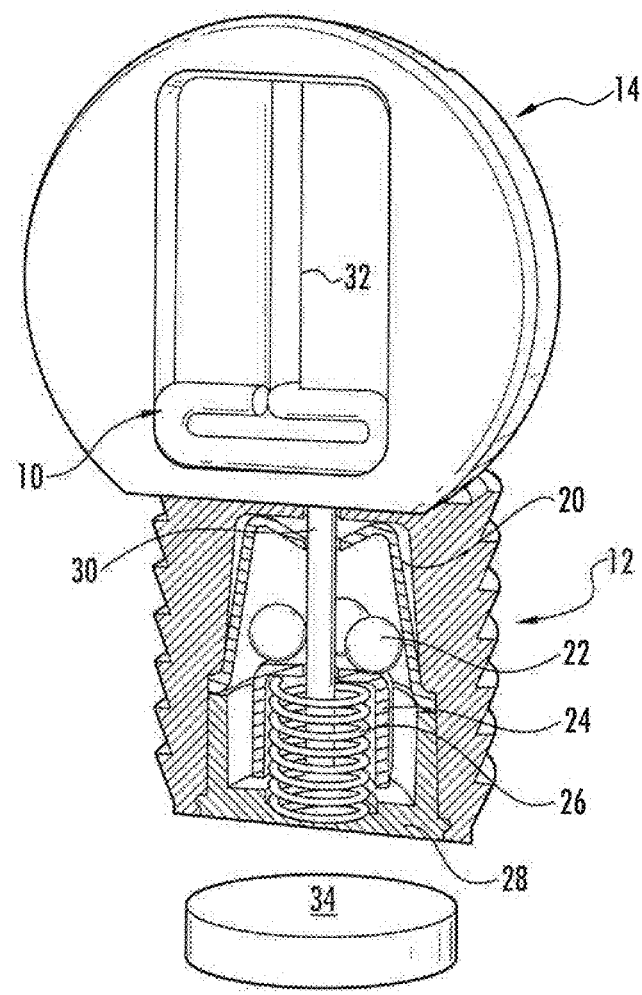
FIG. 5 is a front perspective view of the hardware system of the present invention with the pin in an engaged position, the pin receiver shown in cross section and the means for engaging in a disengaged position.
Figure 6:
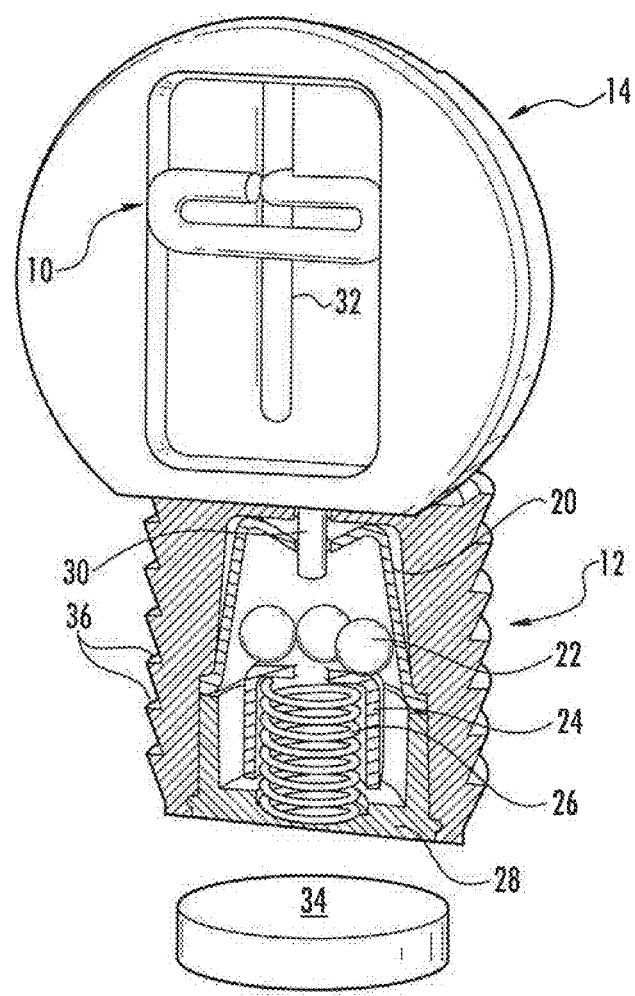
FIG. 6 is a front perspective view of the hardware system of the present invention with the pin in a disengaged position, the pin receiver shown in cross section and the means for engaging in a disengaged position.

Turning to FIG. 5 a magnet 34 can be seen positioned adjacent the second or rear end of the pin receiver 12. The force of the magnet 34 serves to act on the ferromagnetic cap 24, drawing it downwardly to compress the spring 26. This allows the spheres 22 to drop away from the shaft 30 of the pin fastener 10. In this position, the pin fastener 10 can be displaced upwardly to a disengaged position as shown at FIG. 6 in a manner that allows disassembly of the device. In the preferred embodiment such displacement of the pin fastener 10 is manual although a spring may be included that biases the pin fastener 10 to a displaced position so that when the magnet 34 is applied the spring displaces the pin fastener 10 to the disengaged position. It should be appreciated that while the term adjacent is employed to describe the proximity between the magnet and the second end of the pin receiver, such terminology is not meant to be limiting in that the pin receiver may be installed in a furniture component such that the second end of the pin receiver is concealed within the thickness of the component. In that case adjacent simply means adjacent the surface of the furniture component.

The pin receiver 12 is configured and arranged to be frictionally received and retained within a borehole in a furniture panel. In this regard, the pin receiver 12 can be seen to include projections 36 on an outer surface thereof that engage with a borehole in a furniture panel to frictionally retain the pin receiver 12 therein. Similarly, the pin fastener body 14, as shown at FIG. 7 can be seen to include projections 38 on an outer surface thereof that engage with a bore hole in a furniture panel to frictionally retain the pin fastener body 14 therein.

Figure 7:
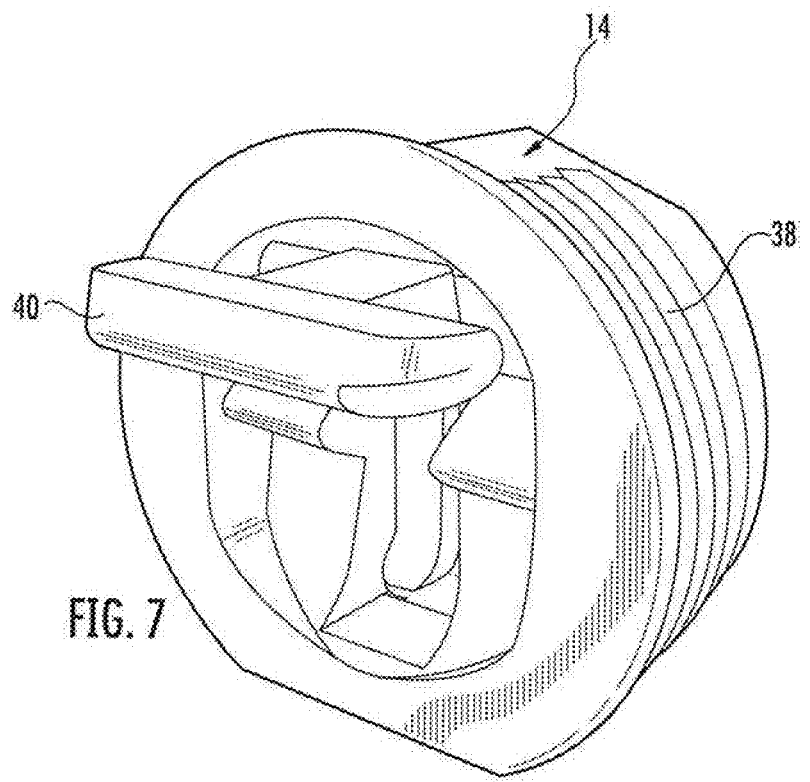
FIG. 7 is a front perspective of an alternate embodiment fastener body with the pin in a disengaged position.
Figure 8:
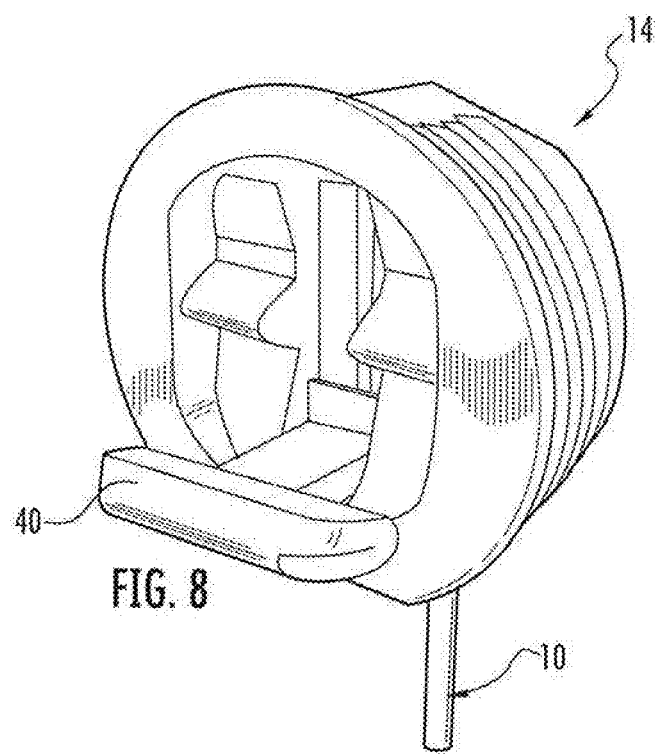
FIG. 8 is a front perspective of an alternate embodiment fastener body with the pin in an engaged position.

Additionally, at FIGS. 7 and 8, an alternate embodiment of the pin fastener body can be seen wherein there is shown an actuator 40. The actuator 40 is engaged with the head of the pin fastener 10 and can be displaced upwardly or downwardly to displace the pin fastener between a disengaged and engaged position respectively. Once the pin fastener 10 is inserted into the pin receiver 12, the actuator 40 is moved to the engaged position in a manner that draws the pin fastener 10 back a slight distance causing a force that draws the joint between the furniture panels together more tightly.

Figure 9:
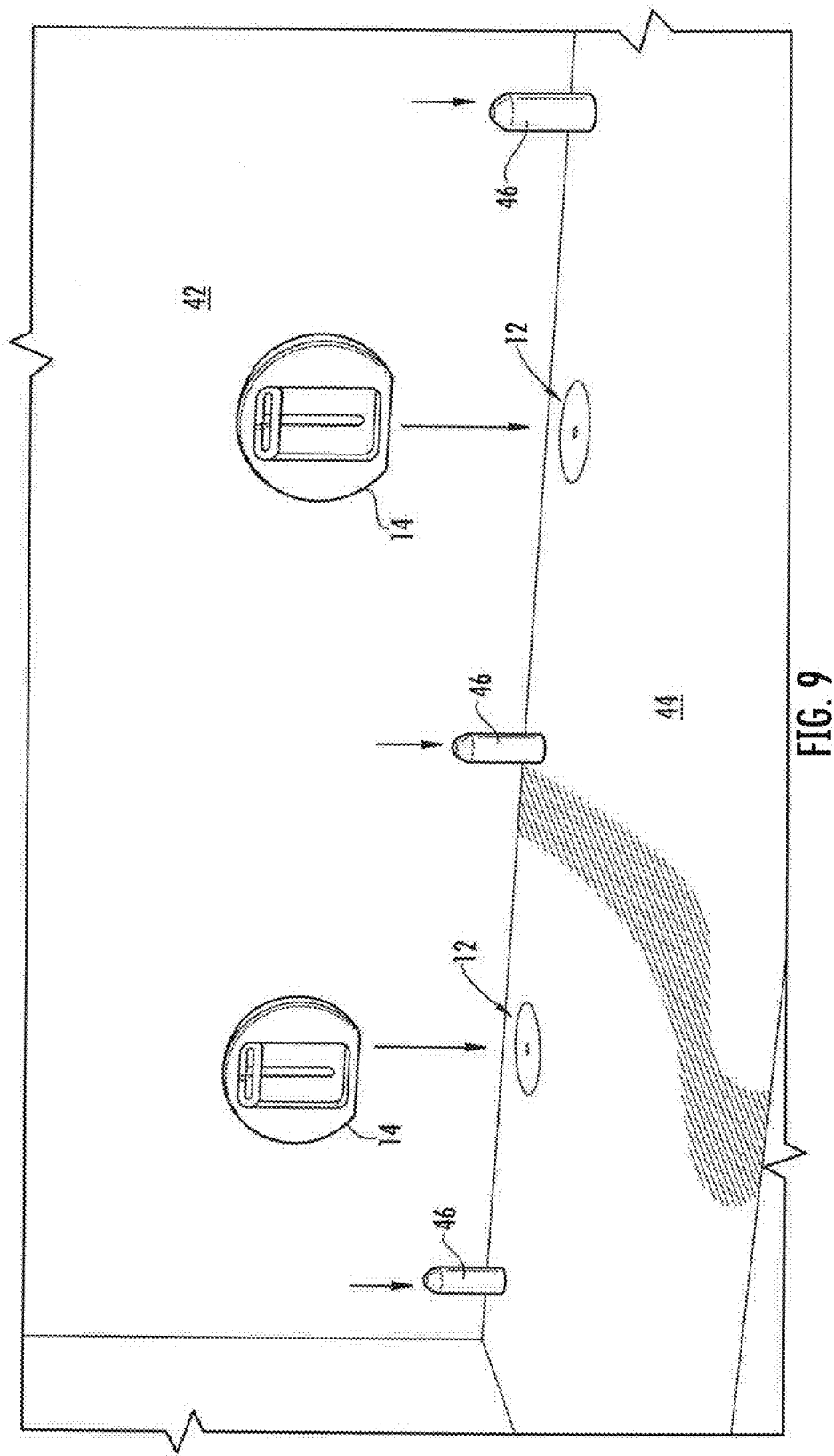
FIG. 9 is a perspective view of the hardware system in the context of furniture panels.

At FIG. 9, the hardware connector system can be seen in the context of fastening two furniture panels 42, 44 together. The pin receiver 12 can be seen fitted into one panel 44 and the pin fastener 14 in the opposing panel 42. Further, it can be seen that dowels 46 are employed to add rigidity and assist in aligning the panels during the assembly process. The use of such dowels is well known in the art and accordingly will not be discussed further herein.

Figure 10:
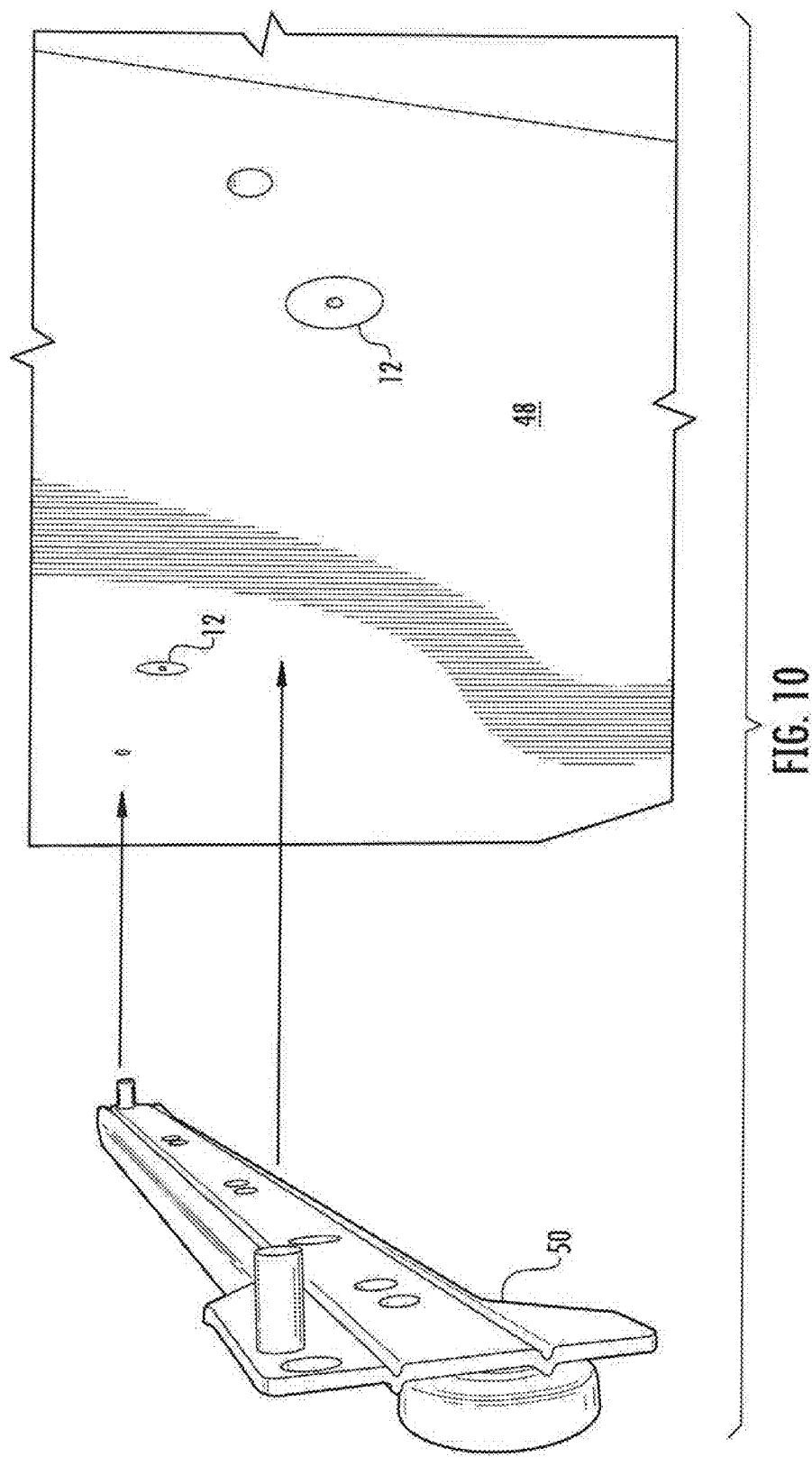
FIGS. 10 and 11 are perspective views of the hardware system in the context of drawer slides.
Figure 11:
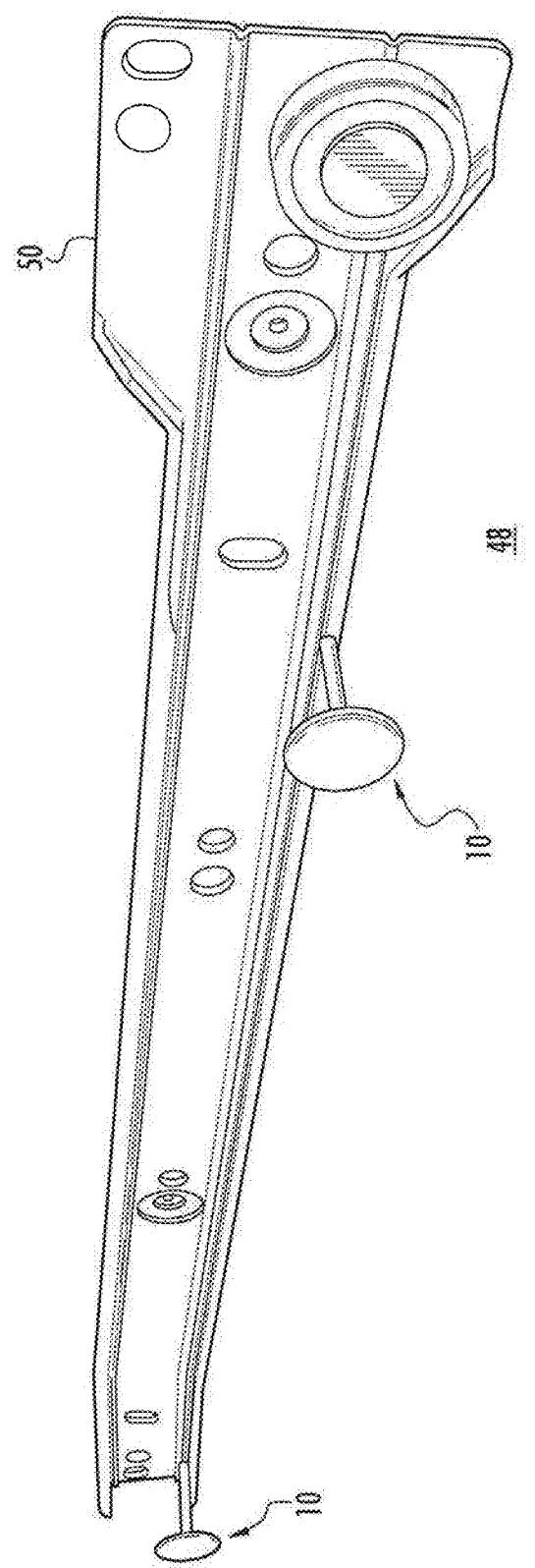
Figure 12:
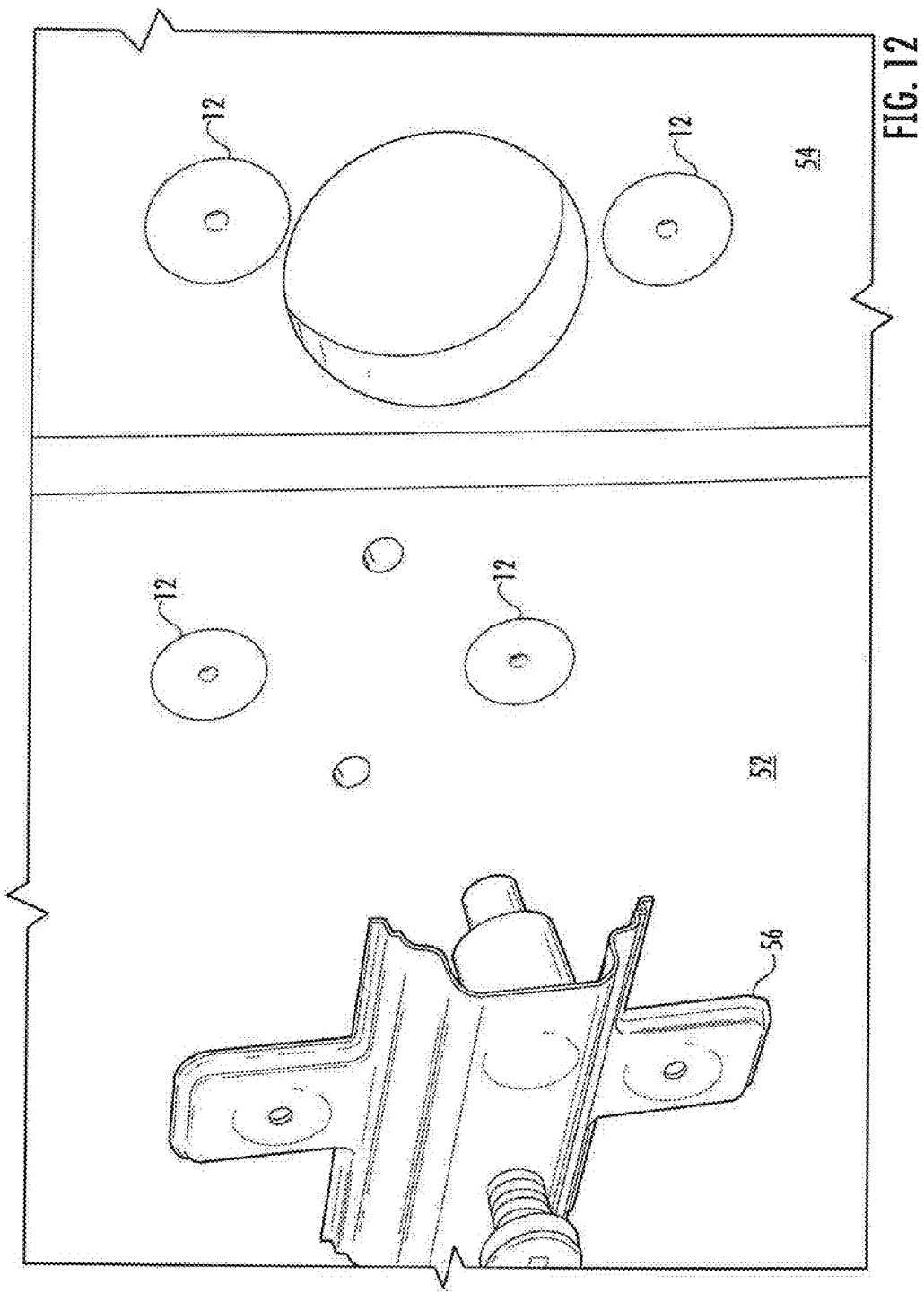
FIGS. 12-15 are perspective views of the hardware system in the context of hinges.
Figure 13:
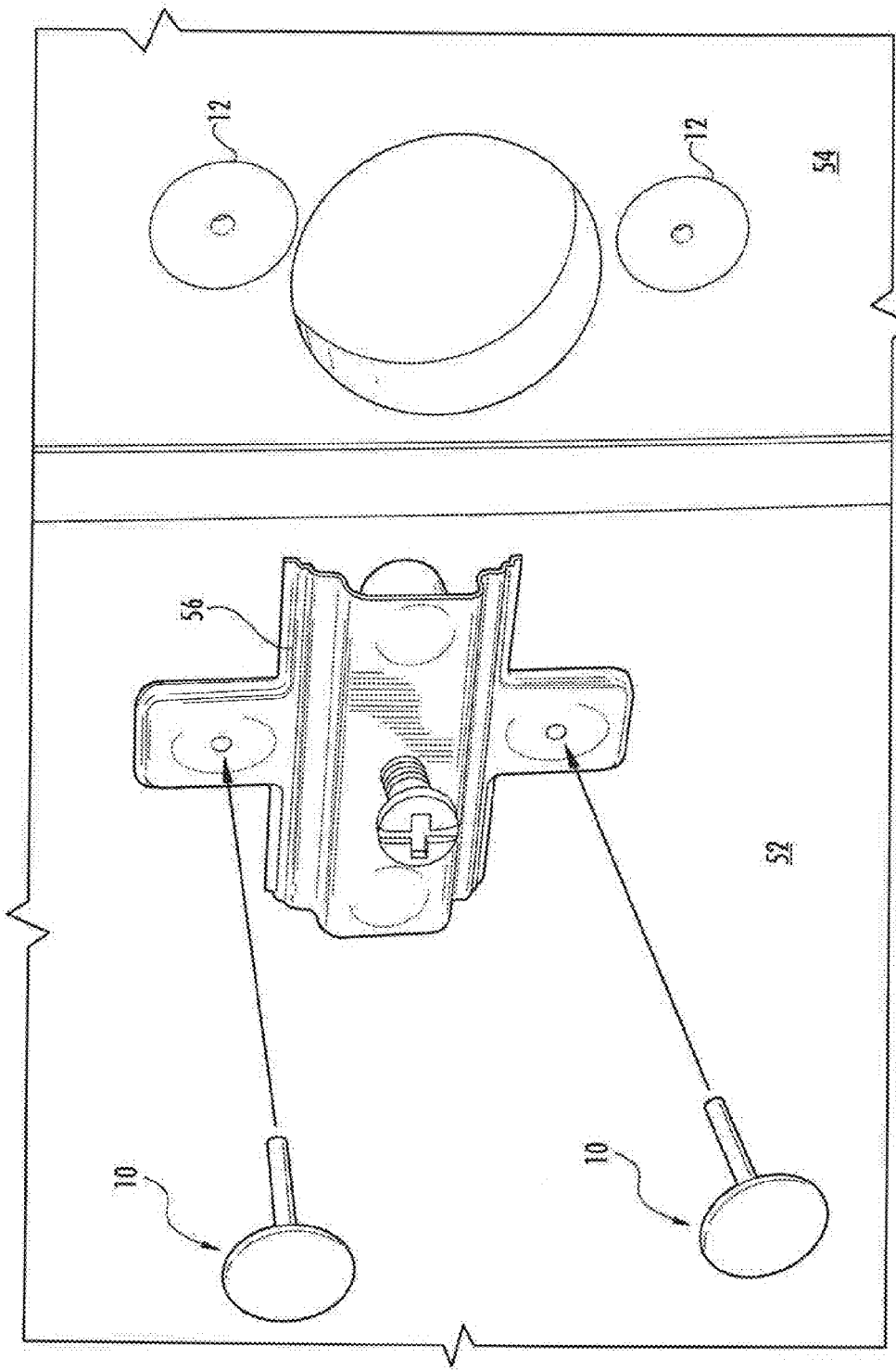
Figure 14:
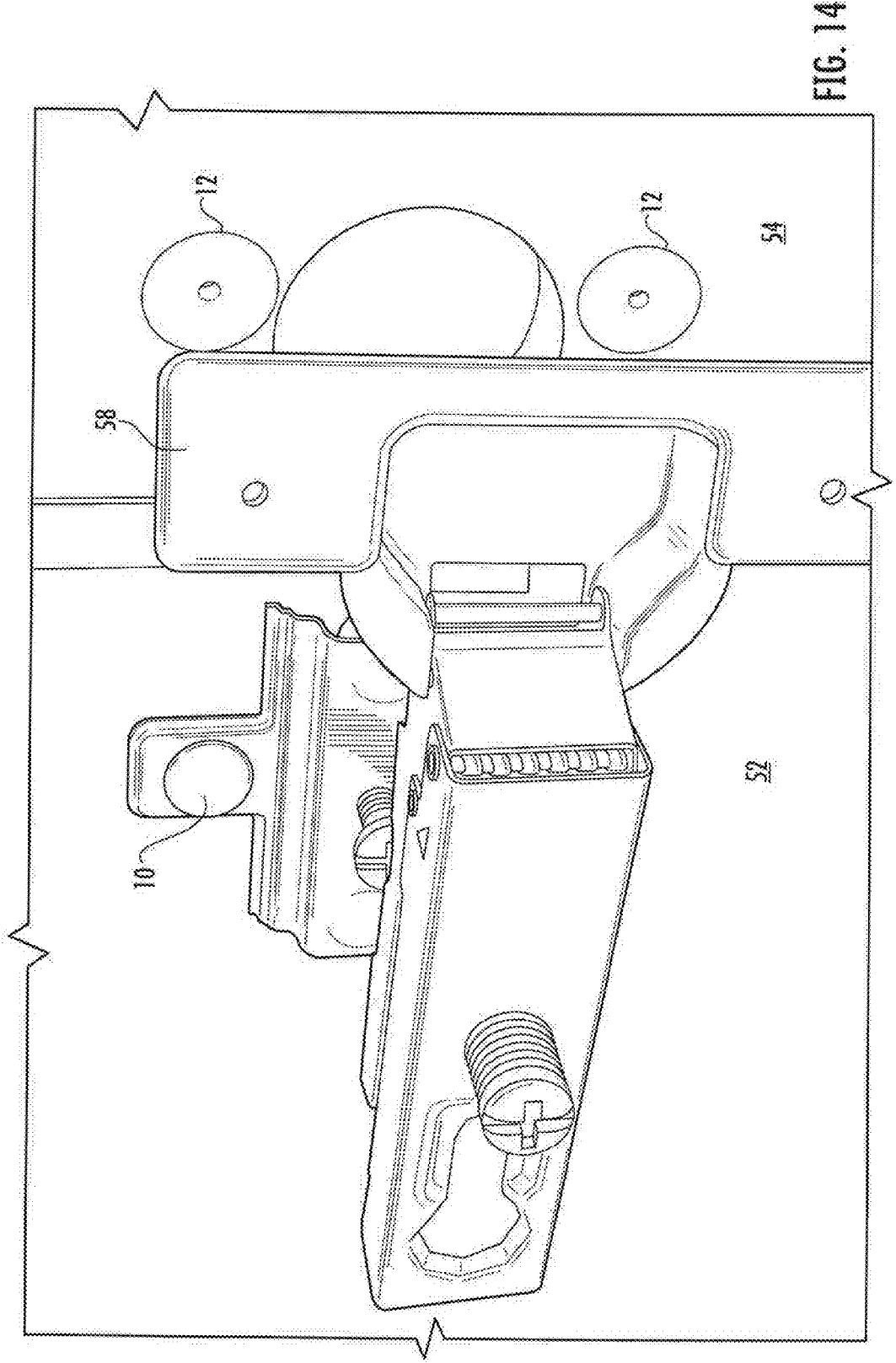
Figure 15:
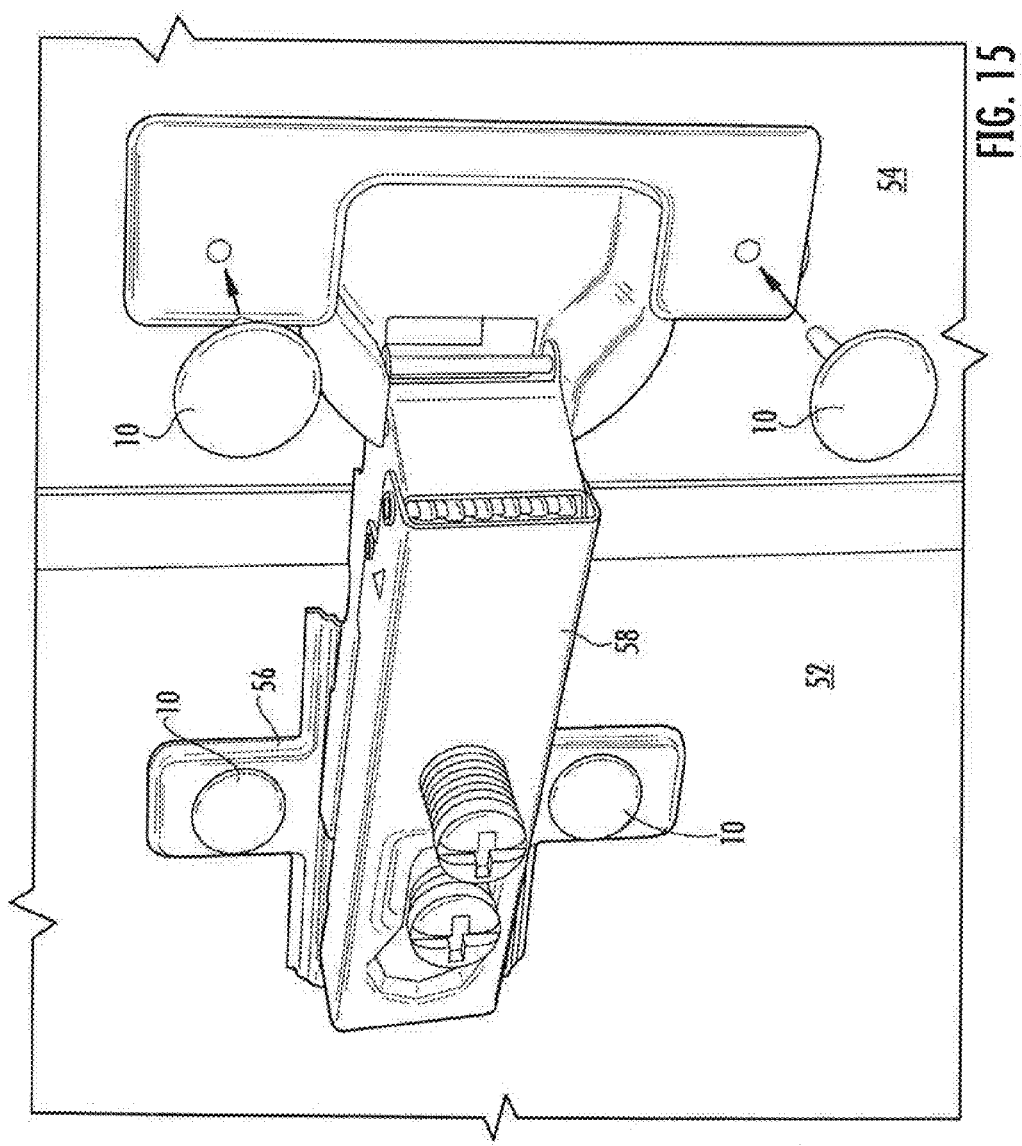

FIGS. 10 and 11 illustrate the use of the hardware connector system of the present invention in fastening a drawer slide 50 to a cabinet panel 48. In the same manner as provided above, a pin receiver 12 is installed into a borehole in the cabinet panel 48. A fastener pin 10 having a head and a shaft is placed through a hole in the drawer slide 50 and is then received into the aperture 16 in the pin receiver 12 thereby fastening the drawer slide 50 to the furniture panel 48. In all other respects, the hardware assembly operates as described above. Metal post projections can be seen extending from the rear of the drawer slide 50. The metal post projections serve to assist in aligning the drawer slide 50 for installation as well as to bear vertical loads applied thereto rather than require that all os such loads be carried by the pin fastener 10 itself.

FIGS. 12-15 show the use of the hardware connector system of the present invention in fastening a hinge to a cabinet. Pin inserts 12 can be seen installed into both the cabinet 52 and door panels 54. Then the cabinet portion 56 of the hinge is installed such that a fastener pin 10 having a head and a shaft is placed through a hole in the cabinet portion 56 of the hinge and is then received into the aperture 16 in the pin receiver 12 thereby fastening the cabinet portion 56 of the hinge to the cabinet panel 52. Similarly, the door portion 58 of the hinge is installed such that a fastener pin 10 having a head and a shaft is placed through a hole in the door portion 58 of the hinge and is then received into the aperture 16 in the pin receiver 12 thereby fastening the door portion 58 of the hinge to the cabinet door 54.

Figure 16:
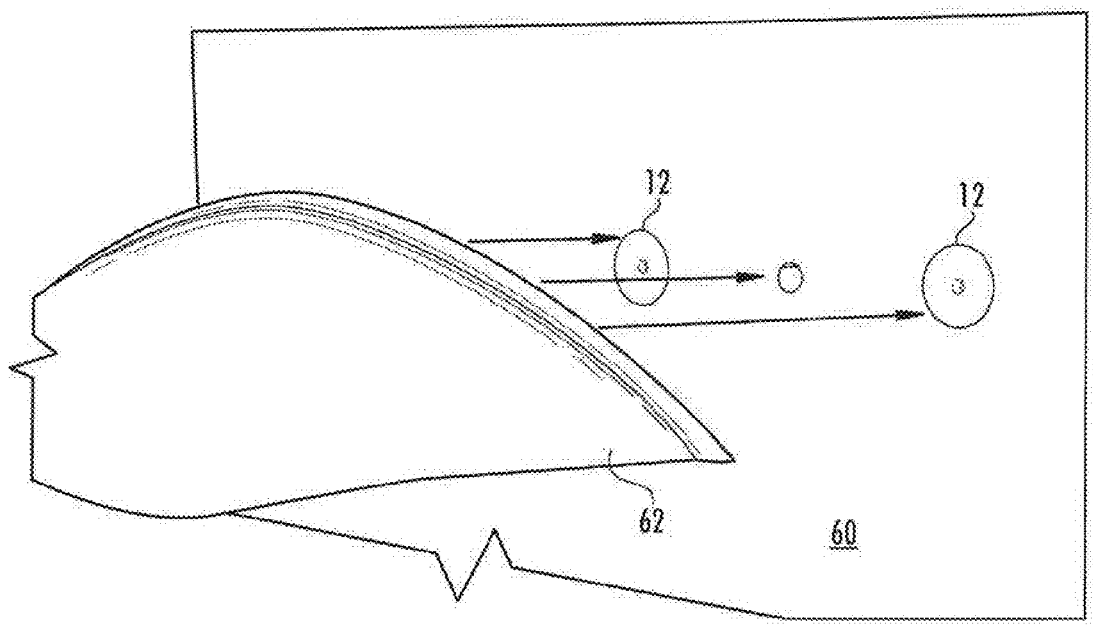

At FIG. 16, a drawer handle/pull 62 is illustrated wherein pin inserts 12 can be seen installed into a furniture panel 60. Then the pull 62 is installed such that a fastener pin 10 having a head and a shaft is placed through a hole in the pull 62 and is then received into the aperture 16 in the pin receiver 12 thereby fastening the pull 62 to the cabinet panel 60. As can be seen at FIG. 17 the pin fastener 10 may be integrated into smaller components such as the pull 64 to allow the installation of the pull 64 by simply pushing the fastener pins 10 on the rear thereof into the pin receiver 12.

It can therefore be seen that the present invention provides a hardware system that can be employed universally throughout a piece of RTA furniture that allows assembly thereof without the need for tools that operates to reliably affix complex RTA furniture components together and that can be employed by people having little to no mechanical inclination in a minimum amount of time. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. Connecting hardware for furniture parts comprising:
a first furniture panel having a first borehole therein;
a pin fastener frictionally received and retained within said first borehole and including a head and a shaft extending therefrom;
a second furniture panel having a second borehole therein;
a pin receiver frictionally received and retained within said first borehole and having an aperture in a first end thereof to slidably receive the shaft portion of the pin fastener; and
a plurality of spheres arranged within said pin receiver in a circular array adjacent said aperture, said spheres being spring biased towards said first end, said spheres being configured and arranged to receive and retain said shaft therebetween when said shaft is slidably received in said aperture.

2. The connecting hardware of claim 1, wherein said pin receiver includes walls which form a cavity in said pin receiver, said walls having a frustoconical shape that narrows towards said first end.

3. The connecting hardware of claim 1, further comprising:
a ferromagnetic cap received between said spheres and a spring generating said spring bias, wherein a magnet received proximate a second end of said pin receiver causes said cap to compress said spring thereby releasing said shaft.

4. Connecting hardware for furniture parts comprising:
a first furniture panel having a first borehole therein;
a pin fastener frictionally received and retained within said first borehole and including a head and a shaft extending therefrom;
a second furniture panel having a second borehole therein;
a pin receiver frictionally received and retained within said first borehole and having an aperture in a first end thereof to slidably receive the shaft portion of the pin fastener;
a shell within said pin receiver adjacent said aperture; and
a plurality of spheres arranged within said shell in a circular array, said spheres being spring biased towards said first end, said spheres configured and arranged to receive and retain said shaft therebetween when said shaft is slidably received in said aperture.

5. The connecting hardware of claim 4, wherein said shell includes walls having a frustoconical shape that narrows towards said first end.

6. The connecting hardware of claim 4, further comprising:
a ferromagnetic cap received between said spheres and a spring generating said spring bias, wherein a magnet received proximate a second end of said pin receiver causes said cap to compress said spring thereby releasing said spheres and allowing withdrawal of said shaft.

7. Connecting hardware for furniture parts comprising:
a first furniture panel having a first borehole therein;
a pin fastener frictionally received and retained within said first borehole and including a head and a shaft extending therefrom; and
a second furniture panel having a second borehole therein;
a pin receiver frictionally received and retained within said first borehole and having an aperture in a first end thereof to slidably receive the shaft portion of the pin fastener;
an assembly configured and arranged to releasably engage the shaft in said received position; and
an actuator engaged with the shaft of said pin fastener, said actuator drawing said shaft back when engaged with said pin receiver causing a force that draws said first and second furniture panels together more tightly.

* * * * *